(12) United States Patent
Choi et al.

(10) Patent No.: US 11,789,873 B2
(45) Date of Patent: *Oct. 17, 2023

(54) SYSTEM AND METHOD FOR LBA-BASED RAID

(71) Applicant: Samsung Electronics Co., Ltd., Suwon-si (KR)

(72) Inventors: Changho Choi, San Jose, CA (US); Nima Elyasi, State College, PA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/588,158

(22) Filed: Jan. 28, 2022

(65) Prior Publication Data
US 2022/0156199 A1 May 19, 2022

Related U.S. Application Data

(63) Continuation of application No. 16/870,344, filed on May 8, 2020, now Pat. No. 11,237,977, which is a
(Continued)

(51) Int. Cl.
*G06F 12/10* (2016.01)
*G06F 3/06* (2006.01)

(52) U.S. Cl.
CPC .............. *G06F 12/10* (2013.01); *G06F 3/061* (2013.01); *G06F 3/064* (2013.01); *G06F 3/065* (2013.01);
(Continued)

(58) Field of Classification Search
CPC ........ G06F 12/10; G06F 3/061; G06F 3/0619; G06F 3/064; G06F 3/065; G06F 3/0679;
(Continued)

(56) References Cited

U.S. PATENT DOCUMENTS

| 5,822,251 A | 10/1998 | Bruce et al. |
| 8,266,501 B2 | 9/2012 | Jeddeloh |

(Continued)

FOREIGN PATENT DOCUMENTS

| CN | 103577111 A | 2/2014 |
| CN | 104407813 A | 3/2015 |

(Continued)

OTHER PUBLICATIONS

Nikolaus, Jeremic et al.; Dataset Management-Aware Software Architecture for Storage Systems Based on SSDs, Article, 2012 IEEE Seventh International Conference on Networking, Architecture, and Storage, IEEE Conference, Jun. 28-30, 2012, pp. 288-292.
(Continued)

*Primary Examiner* — Zhuo H Li
(74) *Attorney, Agent, or Firm* — Lewis Roca Rothgerber Christie LLP

(57) ABSTRACT

A system and method for an LBA RAID storage device. The LBA RAID storage device includes a plurality of data channels and a plurality of storage components. Each of the storage components is connected to one of the plurality of data channels. A storage controller is configured to receive a data and write the data to a RAID group made up of at least two storage components of the plurality of storage components that are each connected to a separate data channel.

20 Claims, 6 Drawing Sheets

Related U.S. Application Data continuation of application No. 15/949,943, filed on Apr. 10, 2018, now Pat. No. 11,221,958.

(60) Provisional application No. 62/621,450, filed on Jan. 24, 2018, provisional application No. 62/551,505, filed on Aug. 29, 2017.

(52) U.S. Cl.
CPC .......... *G06F 3/0619* (2013.01); *G06F 3/0679* (2013.01); *G06F 3/0688* (2013.01); *G06F 2212/1032* (2013.01); *G06F 2212/2022* (2013.01); *G06F 2212/657* (2013.01)

(58) Field of Classification Search
CPC .......... G06F 3/0688; G06F 2212/1032; G06F 2212/2022; G06F 2212/657; G06F 2212/7201; G06F 2212/7205; G06F 12/0246; G06F 11/1076; G06F 3/0689; G06F 3/062; G06F 3/0658; G06F 11/1008

See application file for complete search history.

(56) References Cited

U.S. PATENT DOCUMENTS

| | | |
|---|---|---|
| 8,938,584 B2 | 1/2015 | Nelogal et al. |
| 9,047,220 B2 | 6/2015 | Akutsu et al. |
| 9,251,059 B2 | 2/2016 | Nemazie et al. |
| 9,268,702 B2 | 2/2016 | Bilas et al. |
| 9,319,073 B2 | 4/2016 | Alhussien et al. |
| 9,432,298 B1 | 8/2016 | Smith |
| 9,626,246 B1* | 4/2017 | Parkhurst .............. G06F 3/0647 |
| 10,198,205 B1 | 2/2019 | Freilich |
| 10,353,614 B2 | 7/2019 | Yang |
| 11,221,958 B2* | 1/2022 | Choi .................... G06F 3/0619 |
| 11,237,977 B2* | 2/2022 | Choi .................... G06F 3/0688 |
| 2003/0165076 A1 | 9/2003 | Gorobets et al. |
| 2008/0086608 A1 | 4/2008 | Kano |
| 2010/0037091 A1 | 2/2010 | Baderdinni et al. |
| 2010/0049905 A1 | 2/2010 | Ouchi |
| 2010/0185808 A1 | 6/2010 | Yu et al. |
| 2011/0078496 A1 | 3/2011 | Jeddeloh |
| 2012/0054413 A1 | 3/2012 | Brandt |
| 2013/0166855 A1 | 6/2013 | Batwara et al. |
| 2013/0254454 A1 | 9/2013 | Ide et al. |
| 2014/0380092 A1 | 12/2014 | Kim et al. |
| 2015/0220385 A1 | 8/2015 | Wood et al. |
| 2015/0324145 A1 | 11/2015 | Akutsu et al. |
| 2016/0246518 A1 | 8/2016 | Galbraith et al. |
| 2016/0320991 A1 | 11/2016 | Huang |
| 2017/0123682 A1 | 5/2017 | Sinclair |
| 2017/0300383 A1 | 10/2017 | Kato |
| 2017/0322845 A1 | 11/2017 | Nomura et al. |
| 2017/0337212 A1 | 11/2017 | Hayasaka et al. |
| 2018/0059976 A1 | 3/2018 | Helmick et al. |
| 2019/0065389 A1 | 2/2019 | Choi et al. |
| 2022/0214808 A1* | 7/2022 | Lin ....................... G06F 3/0605 |

FOREIGN PATENT DOCUMENTS

| | | |
|---|---|---|
| JP | 2008-97578 A | 4/2008 |
| KR | 10-2012-0055725 A | 5/2012 |

OTHER PUBLICATIONS

Pan, Yubiao et al.; Grouping-based Elastic Striping with Hotness Awareness for Improving SSD RAID Performance, Article, 2015 45th Annual IEEE/IFIP International Conference on Dependable Systems and Networks, IEEE, Jun. 22, 2015, pp. 160-171.

U.S. Office Action dated Jun. 4, 2020, issued in U.S. Appl. No. 15/832,681 (19 pages).

Chinese Office Action dated Mar. 23, 2023, issued in corresponding Chinese Patent Application No. 201810971349.8 (7 pages).

Korean Office Action dated Apr. 7, 2023, issued in corresponding Korean Patent Application No. 10-2018-0064849 (7 pages).

* cited by examiner

SYSTEM AND METHOD FOR LBA-BASED RAID

CROSS-REFERENCE TO RELATED APPLICATION(S)

The present application is a continuation application of U.S. patent application Ser. No. 16/870,344, filed May 8, 2020, which is a continuation application of U.S. patent application Ser. No. 15/949,943, filed Apr. 10, 2018, which claims priority to, and the benefit of U.S. Provisional Application No. 62/551,505, filed Aug. 29, 2017, and U.S. Provisional Patent Application No. 62/621,450, filed on Jan. 24, 2018, the contents all of which are incorporated by reference in their entirety herein.

This application is also related to U.S. patent application Ser. No. 15/832,681, filed on Dec. 5, 2017, the entire content of which is incorporated herein by reference.

BACKGROUND

1. Field

Some embodiments of the present disclosure relate generally to logical block address (LBA) based RAID in storage devices having multiple storage components.

2. Description of the Related Art

SSD capacity has been steadily increasing since their introduction with modern drives having storage capacity ranging from Gigabytes to Terabytes. As SSD sizes have increased, the potential losses associated with data corruption and drive failure have become a larger issue. Traditionally, Redundant Array of Independent Disks (RAID) has been utilized to provide increased data protection and/or increased storage performance. Common implementations of RAID include data striping across multiple drives (RAID 0), data mirroring (RAID 1), and striping with parity (RAID 5 and RAID 6). Some RAID systems are implemented using static physical page numbers (PPN) (e.g. physical NAND pages) for calculating parity. However, using PPNs in SSDs is inefficient. A more effective method of utilizing RAID in SSDs is therefore needed. Furthermore, while each of the current RAID implementations offers varying degrees of risk mitigation, implementing RAID requires multiple drives. In many applications, utilizing multiple drives is not an option. Thus, a data protection mechanism similar to RAID that is capable of being configured on a single drive is needed.

The above information is only for enhancement of understanding of the background of embodiments of the present disclosure, and therefore may contain information that does not form the prior art.

SUMMARY

Some embodiments of the present disclosure provide a system and method for an LBA RAID storage device. In various embodiments, the LBA RAID storage device has a plurality of data channels and a plurality of storage components. In various embodiments, each of the plurality of storage components is connected to one of the plurality of data channels. In various embodiments, the LBA RAID storage devices further includes a storage controller, configured to receive a data and write the data to a RAID group, the RAID group comprising at least two storage components of the plurality of storage components each connected to a separate data channel.

In various embodiments, the plurality of storage components comprise Flash memory chips.

In various embodiments, the RAID group has M storage components for receiving the data and one parity storage component, where M is greater than 1.

In various embodiments, the RAID group has N storage components for receiving the data and two parity storage components, where N is greater than one.

In various embodiments, the plurality of storage components include a first storage component operating on a first data channel, a second storage component operating on a second data channel, a third storage component operating on a third data channel, and a fourth storage component operating on a forth data channel. In various embodiments, the storage controller is further configured to stripe the data across the first storage component, the second storage component, and the third storage component, calculate a parity for the data, and store the parity on the fourth storage component.

In various embodiments, striping the dataset across the first storage component, the second storage component, and the third storage component includes writing a first dataset to a first logical block address (LBA) on the first storage component, writing a second dataset to a second LBA on the second storage component, and writing a third dataset to a third LBA on the third storage component.

In various embodiments, calculating the parity comprises calculating a parity based on the first LBA, the second LBA, and the third LBA.

In various embodiments, the parity is calculated by taking the exclusive OR (XOR) of the first LBA, the second LBA, and the third LBA.

In various embodiments, the storage controller comprises a LBA-PPN-Parity Table and a Parity Group Table.

In various embodiments, the storage controller is further configured to write the data to a RAID group according to the LBA-PPN-Parity Table and the Parity Group Table.

In various embodiments, the storage controller is further configured to identify a valid entry of a garbage collection erase block in the plurality of storage components, copy a candidate data from the garbage collection erase block to a new physical address on the same storage component of the plurality of storage components, and update the LBA-PPN-Parity Table with the new physical address.

In various embodiments, an LBA RAID storage device has multiple storage components operating on multiple data channels. The LBA RAID storage device includes a first logical block address (LBA) on a first storage component operating on a first data channel, a second LBA on a second storage component operating on a second data channel, a third LBA on a third storage component operating on a third data channel, a forth LBA on a fourth storage component operating on a forth data channel. In various embodiments, the LBA RAID storage device also includes a storage controller, configured to write a data to the first LBA, the second LBA, and the third LBA, calculate a parity for the data, and store the parity on the fourth LBA.

In various embodiments, the first storage component, the second storage component, the third storage component, and the fourth storage component are flash memory chips.

In various embodiments, writing the data comprises striping the data across the first LBA, the second LBA, and the third LBA.

In various embodiments, the parity is calculated by taking the exclusive OR (XOR) of the first LBA, the second LBA, and the third LBA.

In various embodiments, the storage controller comprises a LBA-PPN-Parity Table and a Parity Group Table.

In various embodiments, the storage controller is further configured to write the data to a RAID group according to the LBA-PPN-Parity Table and the Parity Group Table.

In various embodiments, the storage controller is further configured to identify a valid entry of a garbage collection erase block on the first LBA, copy a candidate data from the first LBA to a new physical address on the first storage component, and update the LBA-PPN-Parity Table with the new physical address of the first LBA.

In various embodiments, a method of controlling a solid state disk includes receiving a write request to store a data at a storage controller, writing the data to a first storage component operating on a first data channel, a second storage component operating on a second data channel, and a third storage component operating on a third data channel, and calculating a parity and store the parity in a fourth storage component operating on a fourth data channel.

In various embodiments, writing the data includes writing the data to a first logical block address (LBA) on the first storage component, a second LBA on the second storage component, and a third LBA on the third storage component.

In various embodiments, the method further includes mapping the write request to a RAID group according to a LBA-PPN-Parity Table and a Parity Group Table stored on a firmware.

In various embodiments, calculating a parity includes taking the exclusive OR (XOR) of the first LBA, the second LBA, and the third LBA.

BRIEF DESCRIPTION OF THE DRAWINGS

Some embodiments can be understood in more detail from the following description taken in conjunction with the accompanying drawings, in which.

DETAILED DESCRIPTION

Figure 1:
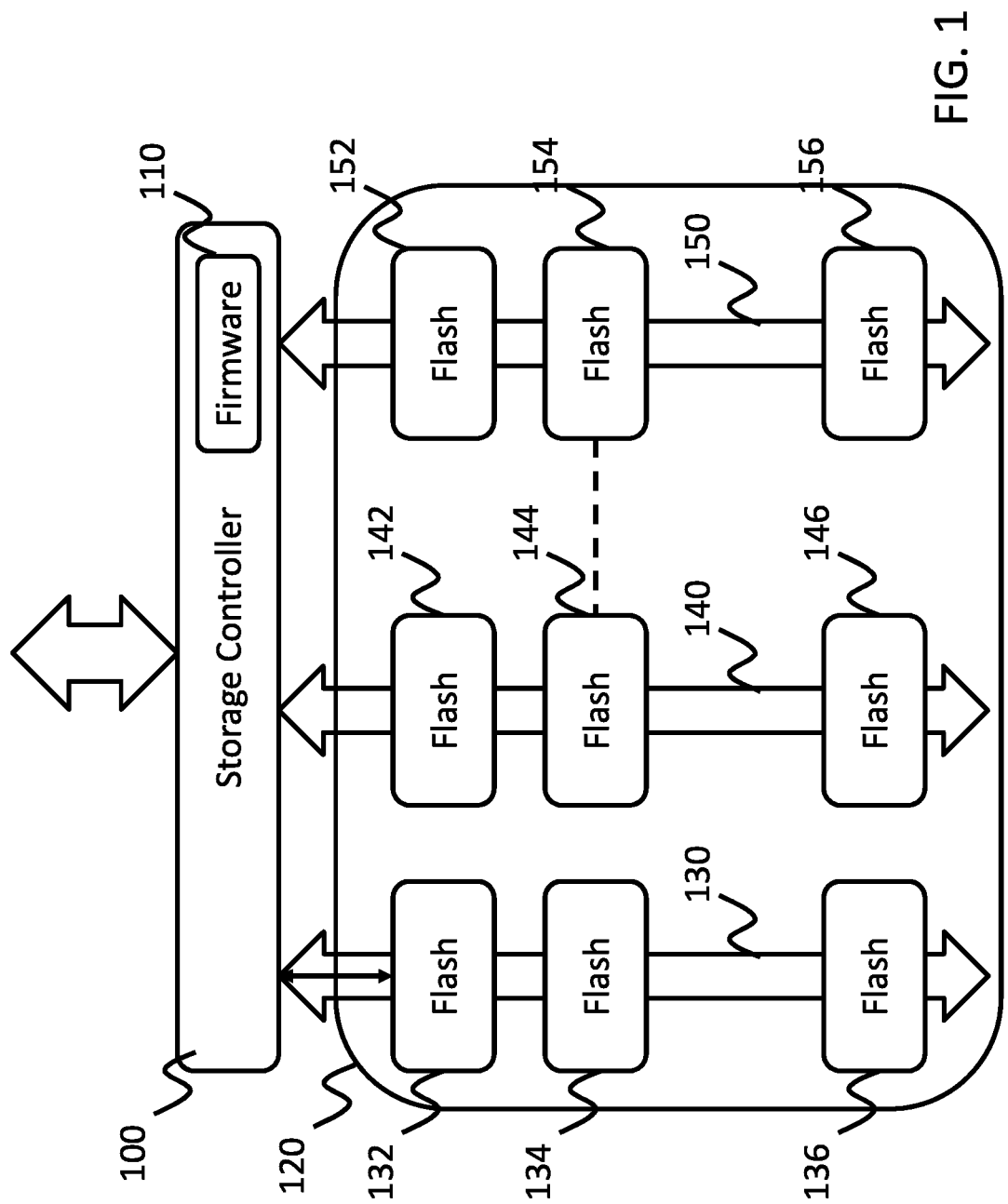
FIG. 1 depicts an example LBA-based RAID storage device in accordance with various embodiments of the present invention.

Features of the inventive concept and methods of accomplishing the same may be understood more readily by reference to the following detailed description of embodiments and the accompanying drawings. Hereinafter, embodiments will be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof will not be repeated. In the drawings, the relative sizes of elements, layers, and regions may be exaggerated for clarity.

In the following description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form in order to avoid unnecessarily obscuring various embodiments.

It will be understood that when an element, layer, region, or component is referred to as being "on," "connected to," or "coupled to" another element, layer, region, or component, it can be directly on, connected to, or coupled to the other element, layer, region, or component, or one or more intervening elements, layers, regions, or components may be present. However, "directly connected/directly coupled" refers to one component directly connecting or coupling another component without an intermediate component. Meanwhile, other expressions describing relationships between components such as "between," "immediately between" or "adjacent to" and "directly adjacent to" may be construed similarly. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present invention. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

When a certain embodiment may be implemented differently, a specific process order may be performed differently from the described order. For example, two consecutively described processes may be performed substantially at the same time or performed in an order opposite to the described order.

Various embodiments are described herein with reference to sectional illustrations that are schematic illustrations of embodiments and/or intermediate structures. As such, variations from the shapes of the illustrations as a result, for example, of manufacturing techniques and/or tolerances, are to be expected. Further, specific structural or functional descriptions disclosed herein are merely illustrative for the purpose of describing embodiments according to the concept of the present disclosure. Thus, embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Embodiments of the present invention include a system and method for logical block address (LBA) RAID. In various embodiments, the system includes a solid state drive (SSD) system having multiple flash memory chips operating on multiple data channels. In some examples, the flash memory chips may be NAND memory chips. In various embodiments, the SSD may be configured for LBA-based RAID by striping the data across flash chips operating on different channels. In various embodiments, a parity may be added using additional chips on a different channel than the ones holding the data.

FIG. 1 depicts an example LBA-based RAID storage device in accordance with various embodiments of the present invention.

Referring to FIG. 1, in various embodiments, the LBA RAID storage device utilizes a multiple memory component architecture to perform LBA-based RAID operations within the LBA RAID storage device. For example, in various embodiments, the LBA RAID storage device includes a storage controller 100 and a firmware 110 for controlling Input/Output (I/O) operations. The storage controller 100 receives I/O requests (e.g. a data) from a host (e.g. a host application) and processes them according to the RAID configuration stored on the firmware 110. In various embodiments, the LBA RAID storage device includes persistent storage 120 that includes a plurality of memory components. For example, the persistent storage 120 may include multiple data channels 130, 140, 150 and each data channel may include multiple memory chips 132-136, 142-146, 152-156. In various embodiments the memory chips may include any persistent memory chips. For example, the memory chips may include flash memory chips (e.g. NAND), 3D XPoint, etc. In various embodiments the controller 100 and firmware 110 may be configured to utilize different memory chips 132-136, 142-146, 152-156 operating on different data channels 130, 140, 150 to create a LBA RAID. For example, in various embodiments, the LBA RAID may stripe data across multiple chips and include parity bits on an additional chip. In another example, the LBA RAID may stripe data across multiple chips and utilizing two additional chips for parity bits. For example, the LBA RAID may be configured in a M data chips+1 parity (similar to RAID 5) or N data chips+2 parity (similar to RAID 6) where M and N are any number bigger than one. Striping data across multiple chips operating on different channels may provide improve drive performance. For example, data bottlenecks may be relieved since I/O from an array may be distributed across multiple channels in the SSD.

Figure 2:
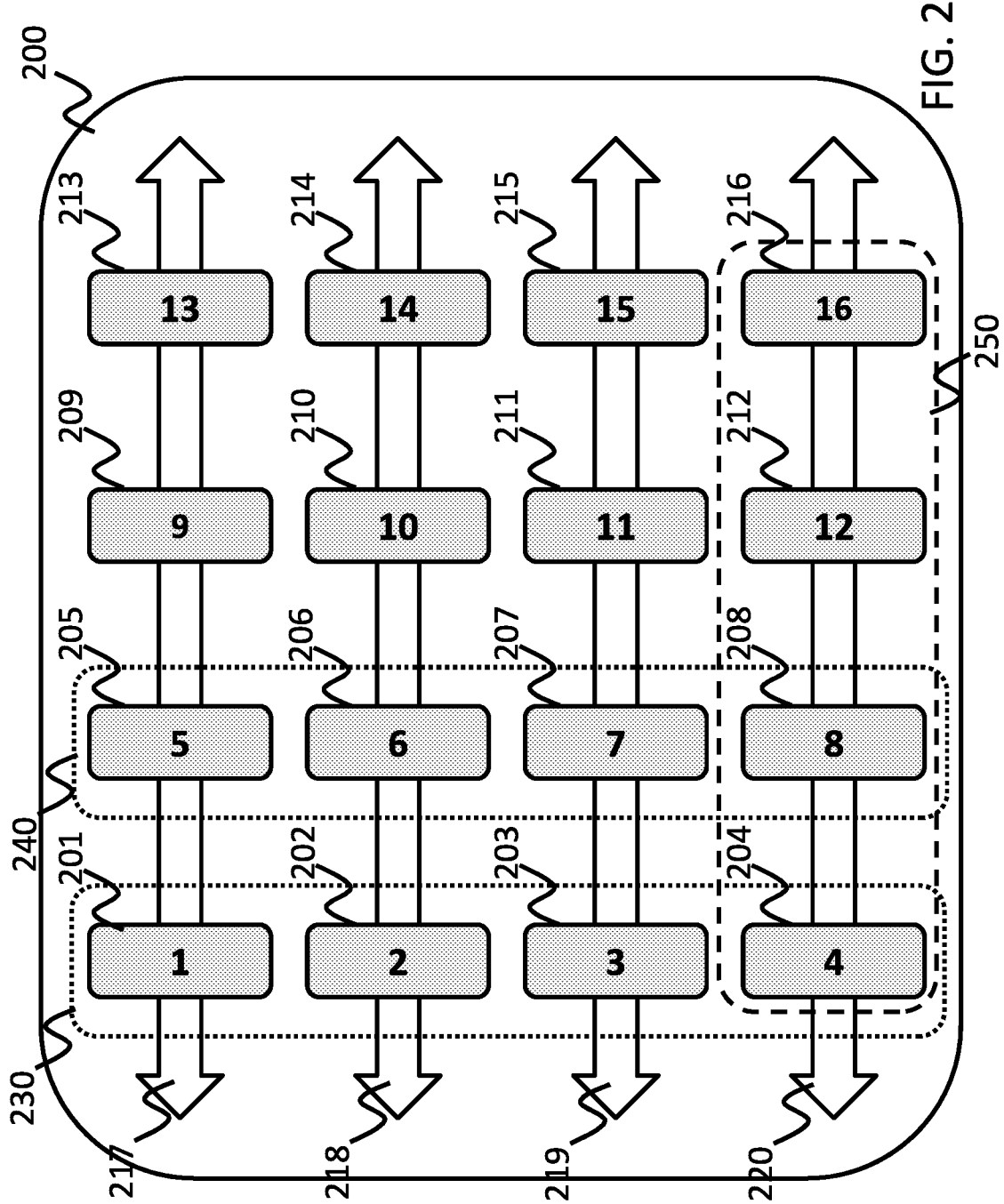
FIG. 2 depicts an example of memory chips and data busses in a LBA-based RAID storage device in accordance with various embodiments of the present invention.

FIG. 2 depicts an example of memory chips and data busses in a LBA-based RAID storage device in accordance with various embodiments of the present invention.

Referring to FIG. 2, in various embodiments, a LBA RAID storage device 200 may be configured to operate with a RAID system utilizing multiple flash memory chips. For example, the LBA RAID storage device 200 includes a plurality of flash memory chips 201-216. In various embodiments, each of the flash memory chips 201-216 may have a logical block address (LBA). In various embodiments, the plurality of flash memory chips 201-216 may operate on multiple data channels 217-220. For example, a first plurality of flash memory chips 201, 205, 209, and 213 may all operate on a first channel 217, a second plurality of flash memory chips 202, 206, 210, and 214 may all operate on a second channel 218, a third plurality of flash memory chips 203, 207, 211, and 215 may all operate on a third channel 219, and a fourth plurality of flash memory chips 204, 208, 212, and 216 may all operate on a fourth channel 220.

In various embodiments, flash memory chips may be grouped into RAID groups. For example, the solid state disk (SSD) 200 may include a first RAID array 230 having a first flash memory chip 201, a second flash memory chip 202, a third flash memory chip 203, and a fourth flash memory chip 204. Similarly, the SSD 200 may include a second RAID array 240 having a fifth flash memory chip 205, a sixth flash memory chip 206, a seventh flash memory chip 207, and an eighth flash memory chip 208. In various embodiments, each of the RAID arrays 230, 240 may be configured with a parity chip. In some examples, the parity bits may be stored on flash memory chips on a different channel. For example, in various embodiments, the flash chips 204, 208 (250) on the fourth channel 220 may all be used for storing parity bits.

In various embodiments, parity data may be calculated based on LBAs. For example, in various embodiments, the first flash memory chip 201 may have an LBA of 1, the second flash memory chip 202, may have an LBA of 2, and the third flash memory chip 203 may have an LBA of 3. The fourth flash memory chip 204 may be the parity value of LBA of 1 and LBA of 2 and LBA of 3. Parity bits may be calculated in any manner consistent with the type of parity being used (e.g. a single parity, a double parity, etc.) For example, in various embodiments, parity for a single parity system may be calculated by taking the exclusive OR (XOR) of the data stored in each of the LBAs in the RAID array (e.g. the parity bits are calculated on a LBA basis). For example, in the first RAID group 230, data may be striped (e.g. split between) across the first flash memory chip 201, the second flash memory chip 202, and the third flash memory chip 203 and parity bits may be calculated by taking the XOR of the data stored on first flash memory chip 201, the second flash memory chip 202, and the third flash memory chip 203, with the resulting parity bits being stored on the fourth flash memory chip 204 (e.g. data(LBA1) XOR data(LBA2) XOR data(LBA3)=parity data).

Figure 3:
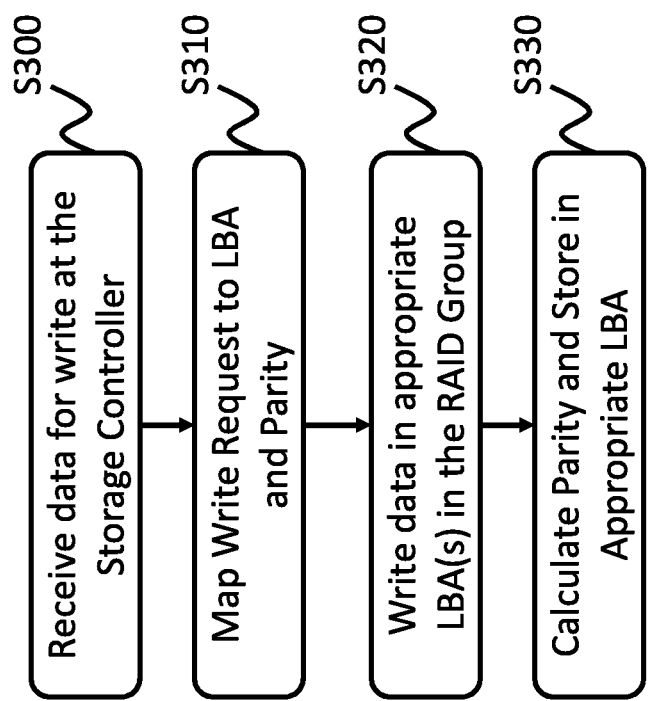
FIG. 3 depicts a method of storing data in an LBA RAID storage device in accordance with various embodiments of the present invention.
Figure 4:
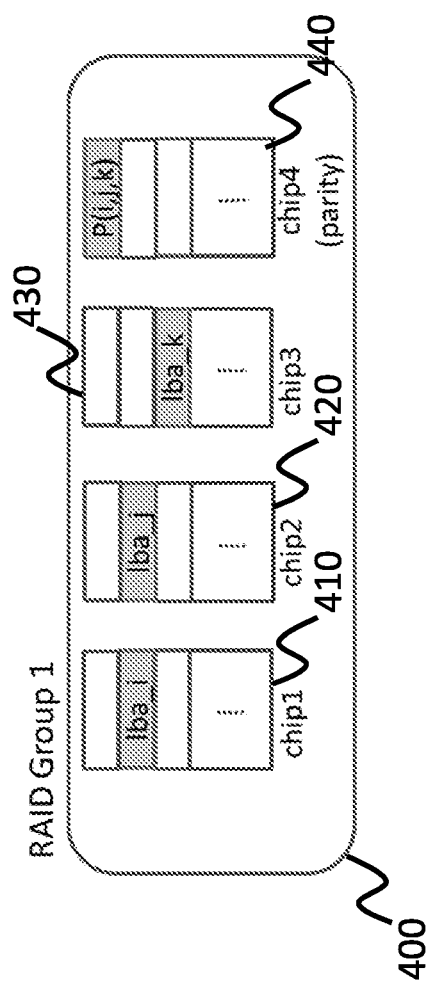
FIG. 4 depicts an LBA-based RAID group operating on an LBA RAID storage device in accordance with various embodiments of the present invention.

FIG. 3 depicts a method of storing data in an LBA RAID storage device in accordance with various embodiments of the present invention. FIG. 4 depicts an LBA-based RAID group operating on an LBA RAID storage device in accordance with various embodiments of the present invention.

Referring to FIGS. 3 and 4, in various embodiments, the LBA RAID storage device may include a RAID group (e.g. a RAID array) 400. In various embodiments, the RAID group 400 may be configured in a 3+1P scheme using a first flash memory chip 410, a second flash memory chip 420 and a third flash memory chip 430 for storing the data and a fourth flash memory chip 440 used for parity (e.g. in the configuration described above with reference to FIG. 2 where data is striped across 3 chips and a fourth chip is used as a parity). In various embodiments, each of the flash memory chips 410-440 may include a plurality of LBAs and performs RAID across the LBAs. For example, the LBA_i, LBAJ, LBA_k, and LBA_P may form a RAID array. In various embodiments, the NAND flash memory chips 410. 420, 430, 440 may be configured with 4 KB physical pages. In some embodiments, data being written may be divided in to RAID element chunks that are multiples of LBA sizes. For example, each LBA may be 512 bytes. Thus, an element may be LBA-sized (512 bytes), 8 LBA-sized (4 KB), 16 LBA-sized (8 KB), etc.

In various embodiments, the LBA RAID storage device receives a storage request to store a dataset from a host (e.g. an application) at the storage controller (S300). In various embodiments, the storage controller may utilize a LBA-PPN-Parity Table and a Parity Group Table to determine the appropriate location for storing the dataset and the associated parity pits (e.g. LBA_i, LBAJ, LBA_k, and LBA_P) (S310). For example, in various embodiments, the storage request is to store the dataset on LBA_i. The storage controller references the LBA-PPN-Parity table and determines the Parity Index for LBA_i is 1. The storage controller may then reference the Parity Table to determine the other LBAs associated with the RAID group and writes to the group. For example, the storage controller maps the split the received dataset such that the first 4 kb of the dataset is written to LBA_i on the first chip 410, the second 4 kb of dataset may then be written to LBA_j on the second chip 420 and so on (S320). The controller may then calculate the parity bits for the written data (e.g. by performing an XOR function) and store the parity bits on the parity LBA_P (S330) (as defined in the Parity Table).

Figure 5:
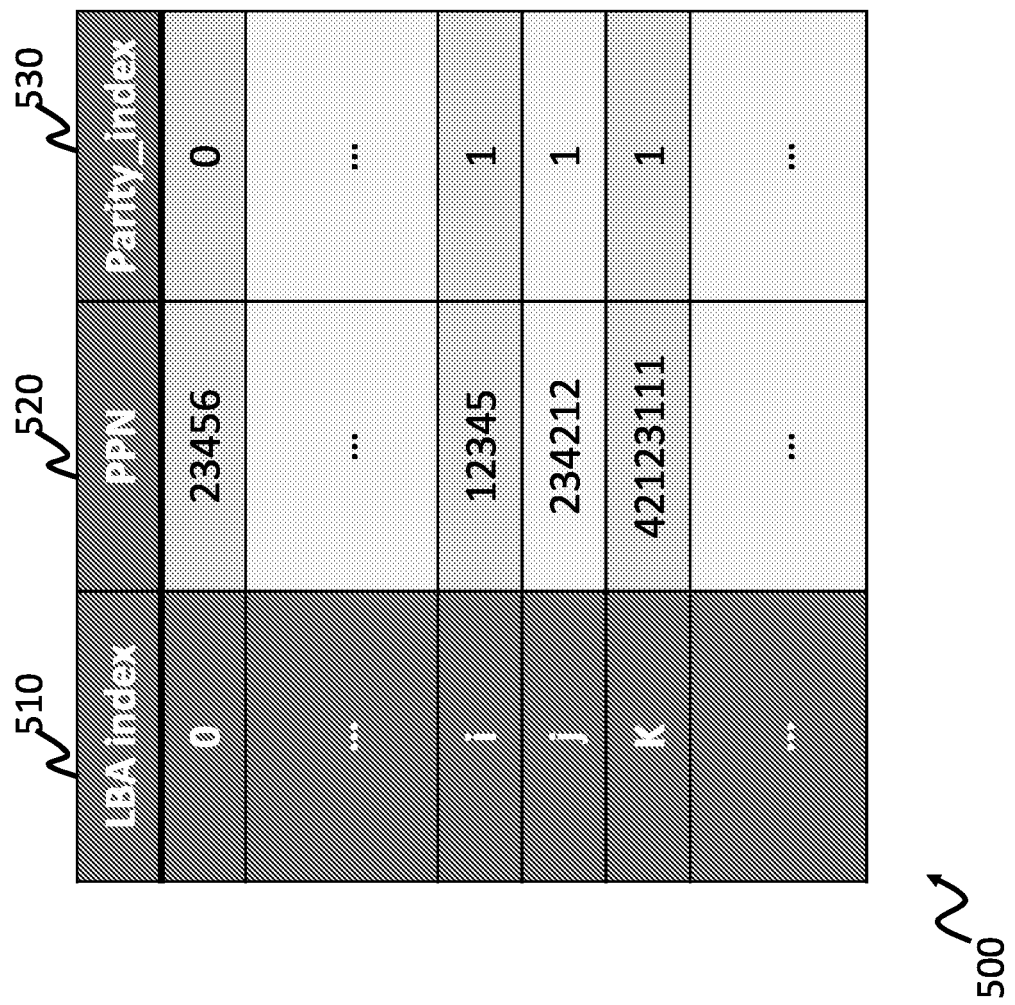
FIG. 5 depicts an example LBA-Physical Page Number (PPN)-Parity Table according to various embodiments of the present invention.
Figure 6:
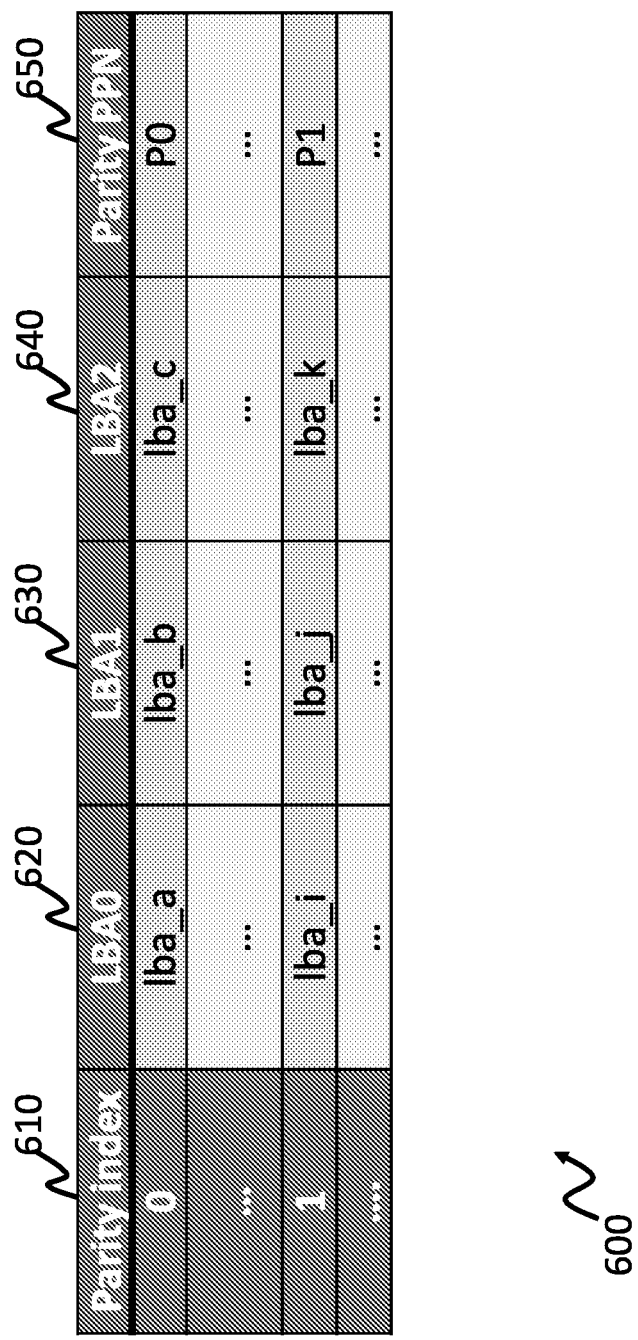
FIG. 6 depicts an example Parity Table according to various embodiments of the present invention.

FIG. 5 depicts an example LBA-Physical Page Number (PPN)-Parity Table according to various embodiments of the present invention. FIG. 6 depicts an example Parity Table according to various embodiments of the present invention.

Referring to FIG. 5 and FIG. 6 the LBA RAID storage device may include a LBA-PPN-Parity Table 500 and a Parity Table 600 for maintaining data locations, RAID arrays, and parity information. In various embodiments the LBA-PPN-Parity Table 500 and the Parity Table 600 may be stored in the storage device's firmware and updated by the storage controller. In various embodiments, the LBA-PPN-Parity Table 500 and Parity Table 600 are configured to define and map the various RAID arrays on the LBA RAID storage device. For example, the LBA-PPN-Parity Table 500 and the Parity Table 600 may define which LBAs form an array and the location of the parity data for each array.

In various embodiments, the LBA-PPN-Parity Table 500 is configured to map LBAs to PPNs and to a parity index. For example, in various embodiments, the LBA-PPN-Parity Table 500 includes an LBA index 510, an associated PPN 520, and an associated parity index 530.

In various embodiments, the Parity Table 600 is configured to define which LBAs are associated with which parity LBAs or PPN. For example, the Parity Table 600 includes a parity index 610 that maps to the parity index 530 from the LBA-PPN-Parity Table 500. Associated with each parity index 610 is each LBA 620, 630, 640 with a Parity PPN 650. For example, as shown in, the LBA-PPN-Parity Table 500, LBA_i, LBA_j, and LBA_k are each associated with the parity index 1. Thus, anytime the data on LBA_i, LBA_j, and LBA_k is modified, the parity P1 is also updated. For example, in various embodiments, when data is updated (e.g. data on at least one of the LBA's of an array is changed), the corresponding parity is also recalculated using an XOR function and the associated PPNs the LBA-PPN-Parity Table 500 and the Parity Table 600 (e.g. the PPN 520 and the Parity PPN 650) are also updated.

In various embodiments, data may be deleted from an LBA in the LBA RAID storage device. For example, in various embodiments, the LBA data may be removed from the parity by XORing the LBA data with the parity. The updated parity may then be stored to a new PPN. The previous PPN and parity index in the LBA-PPN-Parity Table 500 may be deleted. The LBA may then be removed from the Parity Table 600. In some cases, all of the LBAs may have been deleted from a raid array. In the case of all of the LBAs being deleted from one RAID array, the corresponding parity entry (e.g. all the entries associated with a parity index 610) may be deleted from the Parity Table 600.

In various embodiments, the LBA RAID storage device is configured for intra-chip level garbage collection and wear leveling. For example, when a valid data is copied to a new erase block during the garbage collection or wear leveling process, the new erase block may be allocated from the same flash memory chip. For example, LBA_i may be a valid entry of a garbage collection candidate erase block (or wear leveling block) in a flash memory chip x and thus the data in LBA_i needs to be copied to a new erase block. In various embodiments, the new erase block will be allocated in the same flash memory chip x. In these cases, the PPN 520 from the LBA-PPN-Parity Table 500 is updated and no update to the Parity Table 600 is needed (unless the data being moved is parity data).

Accordingly, the above described embodiments of the present disclosure provide a system and method for LBA-based RAID storage devices. In various embodiments, the LBA RAID storage devices have multiple components such as NAND memory chips (e.g. Flash memory chips) that can be used to perform RAID within a SSD offering improvements in data protection and performance. In various embodiments, a LBA-PPN-Parity Table and Parity Group Table are used for mapping the locations of data and associated parity bits.

The foregoing is illustrative of example embodiments, and is not to be construed as limiting thereof. Although a few example embodiments have been described, those skilled in the art will readily appreciate that many modifications are possible in the example embodiments without materially departing from the novel teachings and advantages of example embodiments. Accordingly, all such modifications are intended to be included within the scope of example embodiments as defined in the claims. In the claims, means-plus-function clauses are intended to cover the structures described herein as performing the recited function and not only structural equivalents but also equivalent structures. Therefore, it is to be understood that the foregoing is illustrative of example embodiments and is not to be construed as limited to the specific embodiments disclosed, and that modifications to the disclosed example embodiments, as well as other example embodiments, are intended to be included within the scope of the appended claims. The inventive concept is defined by the following claims, with equivalents of the claims to be included therein.

What is claimed is:

1. A device comprising:
a storage device comprising a first storage component and a second storage component connected to each other; and
a storage controller connected to the storage device and comprising a data structure,
wherein the storage controller is configured to receive data associated with a logical block address (LBA), and write the data to an array of storage components comprising at least two storage components of the first storage component and the second storage component based on the LBA and the data structure.

2. The device of claim 1, wherein the storage controller is connected to the storage device via a data channel,
wherein the storage device further comprises a third storage component and a fourth storage component, wherein the first, second, third, and fourth storage components are connected to each other via the data channel,
wherein the array of storage components comprises a redundant array of independent disks (RAID) group comprising at least two storage components of the first, second, third, and fourth storage components, and
wherein the data structure comprises a first table and a second table, the first table comprising an LBA index and a parity index and the second table comprising LBAs and corresponding parity bits.

3. The device of claim 2, wherein the storage controller receiving the data associated with the LBA and writing the data to the RAID group comprises:
receiving a storage request for the data;
determining a parity from the parity index associated with the LBA;
identifying the RAID group associated with the parity; and
writing the data to the RAID group based on the first table and the second table,
wherein the first table further comprises an LBA-physical page numbers (PPN)-Parity Table and the second table further comprises a Parity Group Table, wherein the storage controller is further configured to write the data to the RAID group according to the LBA-PPN-Parity Table and the Parity Group Table.

4. The device of claim 3, wherein the storage controller is further configured to:
stripe the data across the first storage component, the second storage component, and the third storage component;
calculate a parity for the data; and
store the parity on the fourth storage component.

5. The device of claim 4, wherein striping the data across the first storage component, the second storage component, and the third storage component comprises:
writing a first dataset to a first LBA on the first storage component;
writing a second dataset to a second LBA on the second storage component; and
writing a third dataset to a third LBA on the third storage component,
wherein calculating the parity comprises calculating the parity based on the first LBA, the second LBA, and the third LBA, and wherein the parity is calculated by determining an exclusive OR (XOR) of the first LBA, the second LBA, and the third LBA.

6. The device of claim 5, wherein the data channel comprises a first data channel, a second data channel, a third data channel, and a fourth data channel,
wherein the first storage component is configured to operate on the first data channel, the second storage component is configured to operate on the second data channel, the third storage component is configured to operate on the third data channel, and the fourth storage component is configured to operate on the fourth data channel.

7. The device of claim 3, wherein the storage controller is further configured to:
identify a valid entry of a garbage collection erase block in a storage component of the first, second, third, and fourth storage components;

copy a candidate data from the garbage collection erase block to a new physical address on the storage component; and update the LBA-PPN-Parity Table with the new physical address.

8. The device of claim 7, wherein the storage component comprises flash memory chips, and wherein the RAID group comprises M storage components for receiving the data and one parity storage component, where M is an integer greater than 1.

9. The device of claim 7, wherein the RAID group comprises N storage components for receiving the data and two parity storage components, where N is an integer greater than one.

10. The device of claim 1, wherein the storage device is a logical block address (LBA) redundant array of independent disks (RAID) storage device.

11. A system comprising:
a storage device comprising a first storage component and a second storage component connected to each other; and
a storage controller connected to the storage device and comprising a data structure, the storage controller being configured to:
receive a storage request for data associated with a logical block address (LBA);
identify an array of storage components comprising at least two storage components of the first storage component and the second storage component based on the LBA and the data structure; and
write the data to the array of storage components based on the LBA and the data structure.

12. The system of claim 11, wherein the storage controller is connected to the storage device via a data channel,
wherein the storage device further comprises a third storage component and a fourth storage component, wherein the first, second, third, and fourth storage components are connected to each other via the data channel,
wherein the array of storage components comprises a redundant array of independent disks (RAID) group comprising at least two storage components of the first, second, third, and fourth storage components,
wherein the data structure comprises a first table and a second table, the first table comprising an LBA index and a parity index and the second table comprising LBAs and corresponding parity bits, and
wherein the storage controller is further configured to:
determine a parity from the parity index associated with the LBA;
identify the RAID group associated with the parity associated with the LBA;
write the data to the RAID group based on the first table and the second table,
stripe the data across the first storage component, the second storage component, and the third storage component;
calculate a parity for the data; and
store the parity on the fourth storage component.

13. The system of claim 12, wherein striping the data across the first storage component, the second storage component, and the third storage component comprises:
writing a first dataset to a first LBA on the first storage component;
writing a second dataset to a second LBA on the second storage component; and
writing a third dataset to a third LBA on the third storage component,
wherein calculating the parity comprises calculating the parity based on the first LBA, the second LBA, and the third LBA, and wherein the parity is calculated by determining an exclusive OR (XOR) of the first LBA, the second LBA, and the third LBA.

14. The system of claim 13, wherein the data channel comprises a first data channel, a second data channel, a third data channel, and a fourth data channel,
wherein the first storage component is configured to operate on the first data channel, the second storage component is configured to operate on the second data channel, the third storage component is configured to operate on the third data channel, and the fourth storage component is configured to operate on the fourth data channel.

15. The system of claim 12, wherein the first table further comprises an LBA-physical page numbers (PPN)-Parity Table and the second table further comprises a Parity Group Table, wherein the storage controller is further configured to write the data to the RAID group according to the LBA-PPN-Parity Table and the Parity Group Table.

16. The system of claim 15, wherein the storage controller is further configured to:
identify a valid entry of a garbage collection erase block in a storage component of the first, second, third, and fourth storage components;
copy a candidate data from the garbage collection erase block to a new physical address on the storage component; and
update the LBA-PPN-Parity Table with the new physical address.

17. A method of storing data in a storage device comprising:
receiving, at a storage controller connected to the storage device, a storage request for data associated with a logical block address (LBA);
determining, by the storage controller, a parity associated with the LBA;
identifying, by the storage controller, an array of storage components associated with the parity; and
writing, by the storage controller, the data to the array of storage components based on a data structure of the storage controller.

18. The method of claim 17, wherein the storage device comprises a first storage component, a second storage component, a third storage component, and a fourth storage component,
wherein the array of storage components comprises a redundant array of independent disks (RAID) group comprising at least two storage components of the first, second, third, and fourth storage components, and
wherein the data structure comprises a first table and a second table, the first table comprising an LBA index and a parity index and the second table comprising LBAs and corresponding parity bits.

19. The method of claim 18, further comprises:
striping, by the storage controller, the data across the first storage component, the second storage component, and the third storage component;
calculating, by the storage controller, a parity for the data; and
storing, by the storage controller, the parity on the fourth storage component;
writing, by the storage controller, a first dataset to a first LBA on the first storage component;

writing, by the storage controller, a second dataset to a second LBA on the second storage component; and writing, by the storage controller, a third dataset to a third LBA on the third storage component.

20. The method of claim 19, wherein calculating the parity for the data comprises calculating the parity based on the first LBA, the second LBA, and the third LBA, and wherein the parity is calculated by determining an exclusive OR (XOR) of the first LBA, the second LBA, and the third LBA.

* * * * *